C. J. MATT.
TIRE.
APPLICATION FILED OCT. 9, 1919.

1,411,447. Patented Apr. 4, 1922.

Inventor
Charles J. Matt
by
Owen Owen & Crampton

UNITED STATES PATENT OFFICE.

CHARLES J. MATT, OF TOLEDO, OHIO.

TIRE.

1,411,447.  Specification of Letters Patent.  Patented Apr. 4, 1922.

Application filed October 9, 1919. Serial No. 329,448.

*To all whom it may concern:*

Be it known that I, CHARLES J. MATT, a citizen of the United States, and a resident of Toledo, in the county of Lucas and State of Ohio, have invented a certain new and useful Tire; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a tire which has the required elasticity but which is non-pneumatic. In constructions containing my invention the required elasticity and yieldability is obtained by means of a plurality of springs arranged around the tire. The springs are so made, disposed and connected that they will all co-act to yieldingly resist any movement of the tread relative to the axle of the wheel, and will by reason of the elasticity of the springs tend to cause a return to the normal relation of the tread to the axle. By this arrangement the springs will cooperate to cushion the axle and consequently the car, while running along the road.

The invention may be embodied in tires of different forms and details of such tires may be varied. To illustrate a practical embodiment of my invention I have selected a tire which is made to conform to the shape of the ordinary pneumatic tire and shall hereinafter describe the tire selected. The tire is illustrated in the accompanying drawings.

Figure 1:
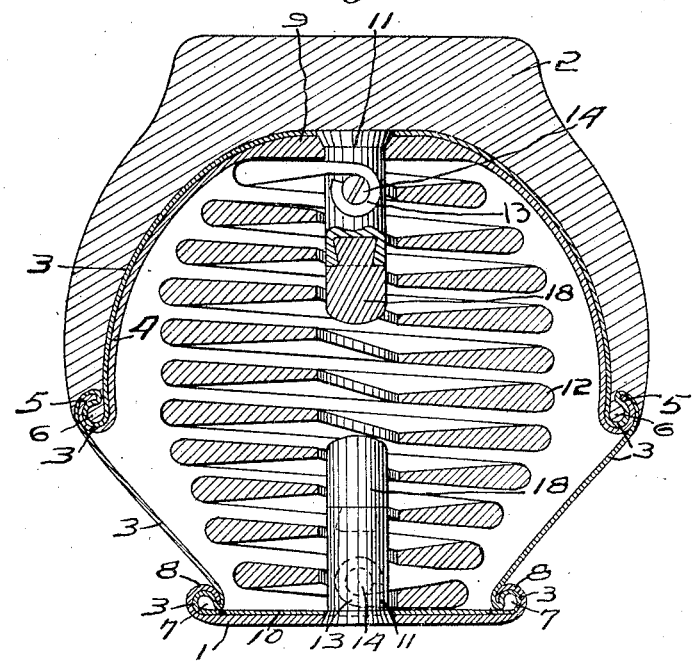
Figure 2:
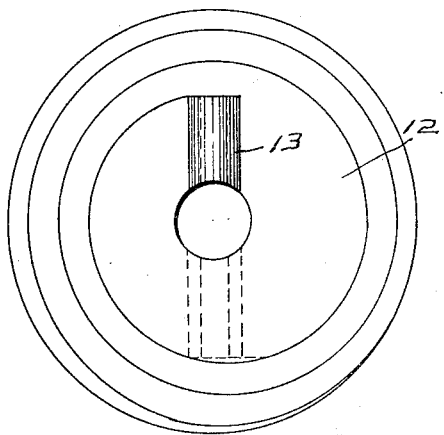
Figure 3:
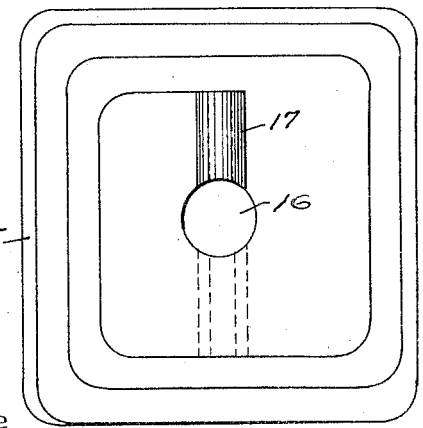
Figure 4:
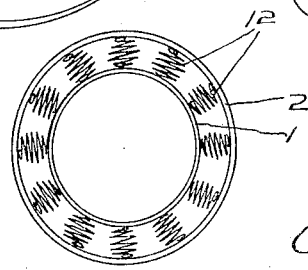

Fig. 1 of the drawings illustrates a transverse section of the tire. Fig. 2 illustrates a top view of one of the springs of the tire. Fig. 3 illustrates a modified form of spring that may be used in place of the spring illustrated in Figs. 1 and 2, and Fig. 4 illustrates a plurality of springs in position between the tread portion and the rim of the wheel.

1 in the drawings is a rim which may be made in the form of the usual demountable rim and to which the tire is secured. 2 is the tread of the tire which may be formed of layers of rubber that are held by a suitable carcass of fabric impregnated with rubber and the whole suitably vulcanized in order to give the proper strength to the tread body. The tread body has near its inner surface, a sheet of fabric 3 that conforms substantially to the shape of the inner surface of the ordinary pneumatic tire. It is likewise impregnated with rubber material or material having rubber base and vulcanized in the tread body. Beneath the tread body and forming a part of the tread portion of the tire is a sheet metal ring 4 that conforms to the shape of substantially the outer half of the ordinary pneumatic tire. It forms a semi-circular tore of elastic material that spreads under pressure and lends elasticity to the wheel. The ring 4 is provided with out turned edges 5 so as to enclose the beads 6 that may be formed in the tread portion 2. The beads 6 are formed in the manner well known in connection with tire construction, namely, by the use of turned parts of the fabric of the tire reinforced with wire hoops. The fabric 3 preferably passes to the outside of the beads 6 and loops around the out turned edges of the ring 4. The fabric 3 extends inwardly to the rim 1 and terminates in beads 7 that may be constructed also of wire hoops surrounded by the inner edges of the fabric 3. The beads 7 are secured in the inturned edges 8 of the rim 1. The central portion of the ring 4 may be reinforced by making the ring thicker within the tread line of the tire as at 9 and the rim 1 may be provided with a hardened bearing plate 10 against which the springs, that provide the elasticity in the tire, may bear.

The rim 1 and the ring 4 are provided with studs 11 while the springs 12 are made of spiral strips having convolutions of slight pitch, the flat sides of the strips extending outward from near the axis of the springs, leaving central axial openings through the springs which are slightly larger than the diameters of the studs 11 and into which or into a part of which the studs 11 extend. The springs bear upon the bearing plate 10 and upon the reinforced portion 9 of the ring 4. The strips of which the springs are formed have turned ends 13 through which the pins 14 extend and are threaded into the studs 11. By this arrangement the springs 12 not only resist the compression produced by the load placed upon the rim 1 when the springs pass beneath the axle of the wheel, but also resist the tension that is produced by the load on the rim pulling on the springs as they pass over the axle. The lateral deflection on the springs is also yieldingly resisted by the springs located at the sides of the axle inasmuch as the studs 11 will engage the inner and outer turns of the springs. Against the lateral movement there will be considerable resistance, though yielding in character, by reason of the fact that the springs are formed of spiral strips.

The flat sides of the strips are each located in a surface formed by a line extending at right angles to the axis of the spring and moved along the axis while being rotated about the axis, the average width of the strips being greater than three times the average thickness of the strips, and the inner edge of each strip being thinner than the outer edge, the outer edge being defined by a rounded surface. Variations of these different flexures of the springs will occur as they pass from beneath the axle to above the axle of the wheel. Consequently at all points in the rotation of the wheel all of the springs operate to yieldingly resist variation in the disposition of the tread relative to the rim and consequently to the axle.

The spring 12 may be modified in its general form. In Fig. 3 is illustrated a modified form of the spring which has a substantially square cross-section, though conforming in its transverse axial section substantially to the interior of the tire, that is, to the space between the ring 4 and the rim 1. The spring 15 is also provided with the central opening 16 that extends through the spring and is substantially of the same size as the studs 11 which the outer ends of the springs surround when placed in position in the tire. It is also provided with the inwardly turned ends 17 for receiving the pins 14.

The studs 11 may also be provided, if desired, with rubber cushions 18 that have a diameter substantially the same as that of the studs 11. The cushions 18 extend towards each other and are located within the opening or passageway through the spirals of the springs 12 or 15. The studs 18 form a buffer in case the springs are compressed to too great a degree. The rubber cushions 18 are of a length sufficient to prevent the adjoining spirals of the springs 12 or 15 from striking.

Having thus described my invention, what I claim as new and desire to secure by Letters Patent, is,—

1. In an automobile tire a tread part and a rim, a plurality of springs located intermediate the tread part and the rim and formed of broad spiral strips having an average width greater than three times the average thickness of the strips, the flat sides of each strip extending laterally from near the axis of the spring and forming an opening through the spring along its axis, the tread part and the rim having studs fitting the said opening.

2. In an automobile tire an elastic tread part and a rim, a plurality of springs located intermediate the tread part and the rim and formed of broad spiral strips having an average width greater than three times the average thickness of the strips, the inner edge of each strip being thinner than the outer edge, and the outer edge being defined by a rounded surface, the flat sides of each strip extending laterally from near the axis of the spring and forming an opening through the spring along its axis, the tread part and the rim having studs in the opening formed through each spring.

In testimony whereof I have hereunto signed my name to this specification.

CHARLES J. MATT.